(12) United States Patent
Cory et al.

(10) Patent No.: US 8,578,277 B2
(45) Date of Patent: Nov. 5, 2013

(54) INTEGRATING CHARTS IN DOCUMENTS

(75) Inventors: Daniel P. Cory, Seattle, WA (US); Kelly J. Lynch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 11/227,044

(22) Filed: Sep. 15, 2005

(65) Prior Publication Data

US 2007/0061751 A1 Mar. 15, 2007

(51) Int. Cl.
*G06F 3/048* (2013.01)

(52) U.S. Cl.
USPC ............................ 715/744; 715/209; 715/215

(58) Field of Classification Search
USPC .................. 715/209, 744, 215, 733; 345/440
See application file for complete search history.

(56) References Cited

U.S. PATENT DOCUMENTS

| | | | | |
|---|---|---|---|---|
| 5,079,695 | A | 1/1992 | Dysart et al. | 395/700 |
| 5,613,058 | A | 3/1997 | Koppolu et al. | 715/744 |
| 5,619,631 | A * | 4/1997 | Schott | 345/440 |
| 5,664,208 | A | 9/1997 | Pavley et al. | 715/209 |
| 6,249,283 | B1 | 6/2001 | Ur | 715/764 |
| 6,407,761 | B1 | 6/2002 | Ching et al. | 715/835 |
| 6,446,135 | B1 | 9/2002 | Koppolu et al. | 719/313 |
| 6,556,220 | B1 | 4/2003 | Hammond | 715/764 |
| 6,701,485 | B1 * | 3/2004 | Igra et al. | 715/210 |
| 6,772,413 | B2 | 8/2004 | Kuznetsov | 717/136 |
| 7,290,205 | B2 | 10/2007 | Moncsko | |
| 2001/0042045 | A1 | 11/2001 | Howard et al. | 705/51 |
| 2003/0149708 | A1 | 8/2003 | Tsao | 707/104.1 |
| 2003/0174165 | A1 | 9/2003 | Barney | 345/747 |
| 2004/0039995 | A1 | 2/2004 | Kuwata et al. | 715/530 |
| 2004/0073872 | A1 | 4/2004 | Yalovsky et al. | 715/517 |
| 2004/0123242 | A1 | 6/2004 | McKibben et al. | 715/513 |
| 2004/0243938 | A1 | 12/2004 | Weise et al. | 715/526 |
| 2005/0044496 | A1 | 2/2005 | Kotler et al. | 715/225 |
| 2005/0289446 | A1 | 12/2005 | Moncsko | |
| 2006/0064632 | A1 * | 3/2006 | Vignet | 715/502 |
| 2006/0284892 | A1 | 12/2006 | Sheridan | 345/661 |
| 2007/0061752 | A1 | 3/2007 | Cory | 715/804 |
| 2008/0177994 | A1 | 7/2008 | Mayer | |
| 2008/0222734 | A1 | 9/2008 | Redlich | |
| 2010/0070542 | A1 | 3/2010 | Feinsmith | |

FOREIGN PATENT DOCUMENTS

| | | |
|---|---|---|
| EP | 00215203 | 6/1988 |
| EP | 1077405 | 2/2001 |
| EP | 1542133 | 6/2005 |
| KR | 10-1997-0007758 | 5/1997 |

OTHER PUBLICATIONS

Killmer, Kimberly A. and George, Nashwa. Show-and-Tell in Real Time, Feb. 2002, Journal of Accountancy.*

(Continued)

*Primary Examiner* — Namitha Pillai
(74) *Attorney, Agent, or Firm* — Merchant & Gould

(57) ABSTRACT

A chart is presented in a host application. The chart is managed by communicating data corresponding to the chart to a separate application and providing functionality for editing the data in the separate application. The presentation of the data in the separate application is distinct from the presentation of the chart in the host application. Changes to the data are communicated the host application when the data is edited in the separate application. The communicated changes to the data are reflected in the presentation of the chart in the host application.

20 Claims, 6 Drawing Sheets

(56) References Cited

OTHER PUBLICATIONS

Written Opinion dated Mar. 4, 2009, in Signapore Patent Application No. 200801273-4.
Amendment filed Jun. 30, 2011, in U.S. Appl. No. 11/227,398.
Office Action dated Nov. 11, 2010, in AU Application No. 2006295278.
Office Action dated Aug. 28, 2009, in CN Pat. Appl. No. 200680033763.X, w/Translation.
Office Action dated Aug. 20, 2010, in CN Pat. Appl. No. 200680033763.X, w/Translation.
European Supplemental Search Report issued Feb. 10, 2011, in EP Pat. Appl. No. 06802783.8.
Office Action dated Mar. 1, 2011, in EP Pat. Appl. No. 06802783.8.
Office Action dated Dec. 31, 2008, in U.S. Appl. No. 11/227,398.
Office Action dated Aug. 19, 2009, in U.S. Appl. No. 11/227,398.
Office Action dated Jan. 18, 2011, in U.S. Appl. No. 11/227,398.
Amendment filed May 29, 2009, in U.S. Appl. No. 11/227,398.
Amendment filed Feb. 18, 2010, in U.S. Appl. No. 11/227,398.
Johnson, S.; "*Excerpts from MS Word 2003 Step by Step*"; Copyright: Oct. 20, 2003.
Office Action dated Jun. 23, 2011, in CN Pat. Appl. No. 200680033763.X, w/Translation.
Office Action dated Nov. 7, 2011, in EP Appl. No. 06 802 783.8.
Office Action dated Aug. 17, 2011, in MX Appl. No. MX/a/2008/003416, w/English Summary.
Office Action dated Sep. 15, 2011, in U.S. Appl. No. 11/227,398.
Avantgarde, Ltd., "Technique for Creating an Excel Graph to Create Material or Make a Presentation, a one-level-higher use technique <Using Two Methods for OLE for Different Purposes>," Touch PC, vol. 3, No. 11, p. 94, Mainichi Communications Inc., Japan, Nov. 24, 1998, w/partial translation.
Morihiro Sada, "Introduction to a Personal Computer for Beginners in Their Fifties, Special Practice Lecture 30, Nuts and Bolts of Creating Power Point Presentation Material by Using OLE Functions," OA Business Personal Computing, vol. 16, No. 7, pp. 106-110, Dempa Publications, Inc., Japan, Jul. 1, 1998, w/partial translation.
Office Action dated Jan. 6, 2012, in JP Appl. No. 2008-531159, w/English translation.
Litwin, P., et al.; "Access 2002 Enterprise Developer's Handbook"; Dec. 2002.
Summons to Oral Proceedings dated Oct. 2, 2012, in EP Appl. No. 06 802 783.8.
Office Action dated Apr. 17, 2012, in MX Appl. No. MX/a/2008/003416, w/English Summary.
Office Action dated Jul. 19, 2012, in U.S. Appl. No. 11/227,398.
Office Action dated Oct. 26, 2012, in JP Appl. No. 2008-531159, w/English translation.
Office Action dated Feb. 4, 2013, in KR Appl. No. 10-2008-7006325, wlEnglish translation.
Amendment filed Jan. 14, 2013, in U.S. Appl. No. 11/227,398.

\* cited by examiner

INTEGRATING CHARTS IN DOCUMENTS

BACKGROUND

As the number of applications available for performing tasks on a computing device increases, the expectation for a seamless user experience among these applications also increases. When working with objects in one application, there is an expectation that the same object will function equivalently when used in a second application. This is especially true for applications included in the same software suite.

However, since many applications provide their own support for the object, the user experience often varies among these applications. For example, a chart created in a powerful charting application is often not supported equivalently when the user attempts to create the same chart in a presentation (e.g., slideshow) application. With certain objects, the user may be unable to create the object at all.

Certain applications allow objects from one or more of the other applications to be embedded within the documents that the application creates. For example, a table generated by a spreadsheet application may be embedded directly amongst text in a word processor document created by a word processor application. However, for each solution, not all the functionality that was available in the first application remains available for the object when embedded in the second application.

For example, one standard for embedding an object in document of another application is referred to as the Object Linking and Embedding (OLE) standard. OLE is a compound document standard developed by the Microsoft® Corporation of Redmond, Wash. OLE enables a developer to create objects with one application and then link or embed them in a second application. Embedded objects retain their original format and links to the application that created them. Accordingly, when the document linked to the object is edited and updated, the object itself is also updated. However, OLE has distinct disadvantages since it often stores the embedded object as an image, creating large files and objects that can't be edited inline. The variety of object support solutions available results in a variety of advantages and disadvantages associated with each solution.

SUMMARY

Aspects of the present invention are generally related to integrating charts in documents. One aspect uses a spreadsheet document as the source for chart data used in other host applications. Previously, charts included in applications that were not directly related to chart generation suffered from a stripped down set of features. Many of the features available in a spreadsheet application that directly supports chart creation are not available for chart creating in the other host applications. For example, certain formulas and sorting capabilities that may be used in conjunction with a chart in the spreadsheet application are not available in the host application. Also, certain types of charts that are relatively straightforward to create in the spreadsheet application may be extremely difficult to create in a host application. One aspect of the present invention alters the charts of a host application so that the data of the charts is obtained from a spreadsheet document. This allows the charts in the host application to have the same feature set as a chart in the spreadsheet application, as well as the editing power of the spreadsheet application when using the charts. Accordingly, whether the chart is created in another host application or embedded from a spreadsheet application, using and editing the chart remains the same, providing a more seamless user experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
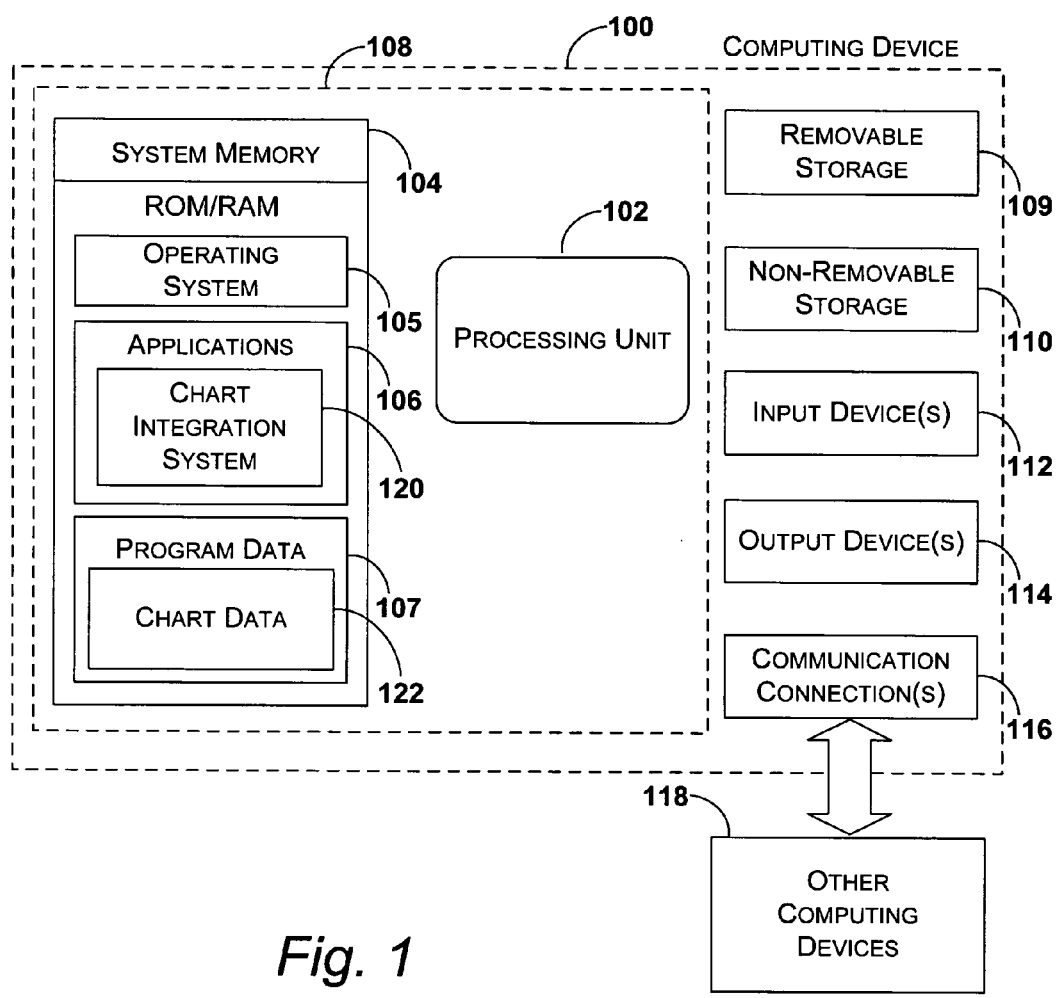
FIG. 1 illustrates an exemplary computing device that may be used in accordance with one exemplary embodiment.

With reference to FIG. 1, one exemplary system for implementing the invention includes a computing device, such as computing device 100. Computing device 100 may be configured as a client, a server, mobile device, or any other computing device. In a very basic embodiment, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a chart integration system 120 for implementing the system of the present invention. Additionally, program data 107 includes chart data 122. This basic embodiment is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

An embodiment executed by computing device 100 provides for using a spreadsheet document as the source for chart data 122 for charts included in the documents of a host application. Chart integration application 120 provides for the integration of the chart data of a spreadsheet with the chart representation in the host application. Accordingly, the functionality provided by the spreadsheet for the chart is made available within the host application. A user may edit the chart and change the presentation of the chart according to the feature set provided by the spreadsheet application, rather than a more limited feature set.

Except for a broader meaning that allows the disclosure and claims herein to encompass a wider variety of alternative embodiments, the following terms as used herein and throughout the claims are generally defined as follows:

"Chart" generally refers to a graph, a bar chart, a line chart, a pie chart, tabular chart, or other pictorial depiction of data that may be included in a document. As used herein, there is no limitation on the types of charts that may be included in a particular document.

"Document" is generally defined as any page, sheet, form, or other construction of an application that comprises text, graphical objects, tables, data cells, or other types of data representations. Examples of documents include word processor documents, spreadsheets, charts, slides, web pages, worksheets, notes, e-mail messages, instant messages, drawings, schematics, images, and other arrangements of text and/or graphical objects.

"Feature set" is generally defined as the set of functions or features associated with a particular application. An exemplary feature set of an application supporting chart creation includes sorting functionality, support of formulas, support of chart types, as well as other functions and abilities that provide chart manipulation capabilities.

"Host application" generally refers to an application in which a chart is embedded or linked. The host application includes a visual representation of the chart within a document of the host application. Host applications may include presentation applications, word processor applications, and other applications that may include a chart.

"Presentation application" generally refers to an application that is configured to provide a presentational display to a user. For example, a slideshow may include one or more slides in a generated presentation. These slides correspond to individual documents produced by the presentation application. An example of a presentation application includes the PowerPoint® software program produced by the Microsoft® Corporation of Redmond, Wash.

"Spreadsheet" is generally defined as a document or database that includes a grid of cells that contain data. One example of a spreadsheet includes a worksheet generated in the Excel® software program produced by the Microsoft® Corporation of Redmond, Wash. Another example of a spreadsheet includes a data grid generated in the Access® software program produced by the Microsoft® Corporation of Redmond, Wash. Each spreadsheet is associated with functionality for producing a chart that corresponds to the data included in the spreadsheet.

"Spreadsheet application" generally refers to an application that is configured to produce a spreadsheet (see "spreadsheet definition above).

Figure 2:
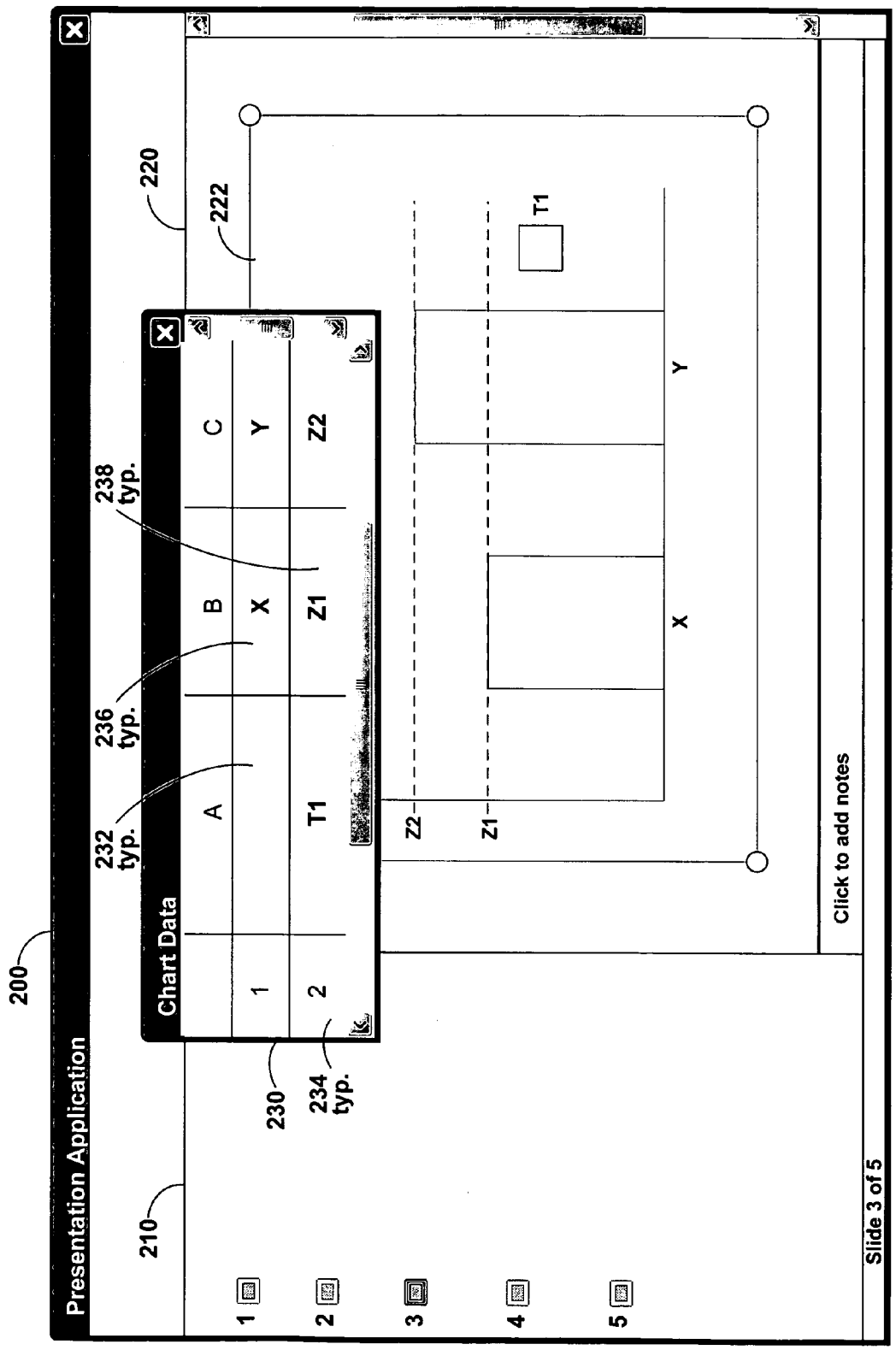
FIG. 2 illustrates an exemplary screenshot of a chart included in a presentation application.

FIG. 2 illustrates an exemplary presentation application screenshot that includes a chart. Presentation application 200 corresponds to a previous version of a presentation application that handled the support of chart data internally. Presentation application 200 included slide listing field 210, slide field 220, and chart data field 230.

Slide listing field 210 lists the slides available for viewing and editing included in the current presentation file loaded into presentation application 200. Slide listing field 210 also contained a written or visual indication of the slide currently being viewed. A slide listing is common to most presentation applications and is known in the art. Therefore, slide listing field 210 is not discussed in further detail herein.

Slide field 220 included the content of the slide currently being viewed. In the present example, the slide content included chart 222. Chart 222 is shown as bar chart. When chart 222 was selected to be inserted into slide field 220, presentation application 200 also initiated chart data field 230.

Chart data field 230 was provided as a pop-up window overlaid onto the window of presentation application 200.

The chart data field was part of the content provided by presentation application 200. Chart data field included data cells (e.g., 232), column and row label cells (e.g., 234), chart data cells (e.g., 236), and chart axis label cells (e.g., 238). The correlation among the data included in the chart data cells and the chart axis label cells resulted in the formatting of the data within chart 222.

With presentation application 200 providing its own support for entering chart data, the functionality associated with creating and editing a chart was limited. Furthermore, the window corresponding to chart data field 230 constantly needed managing for position and sizing depending on the portion of the presentation being viewed.

Figure 3:
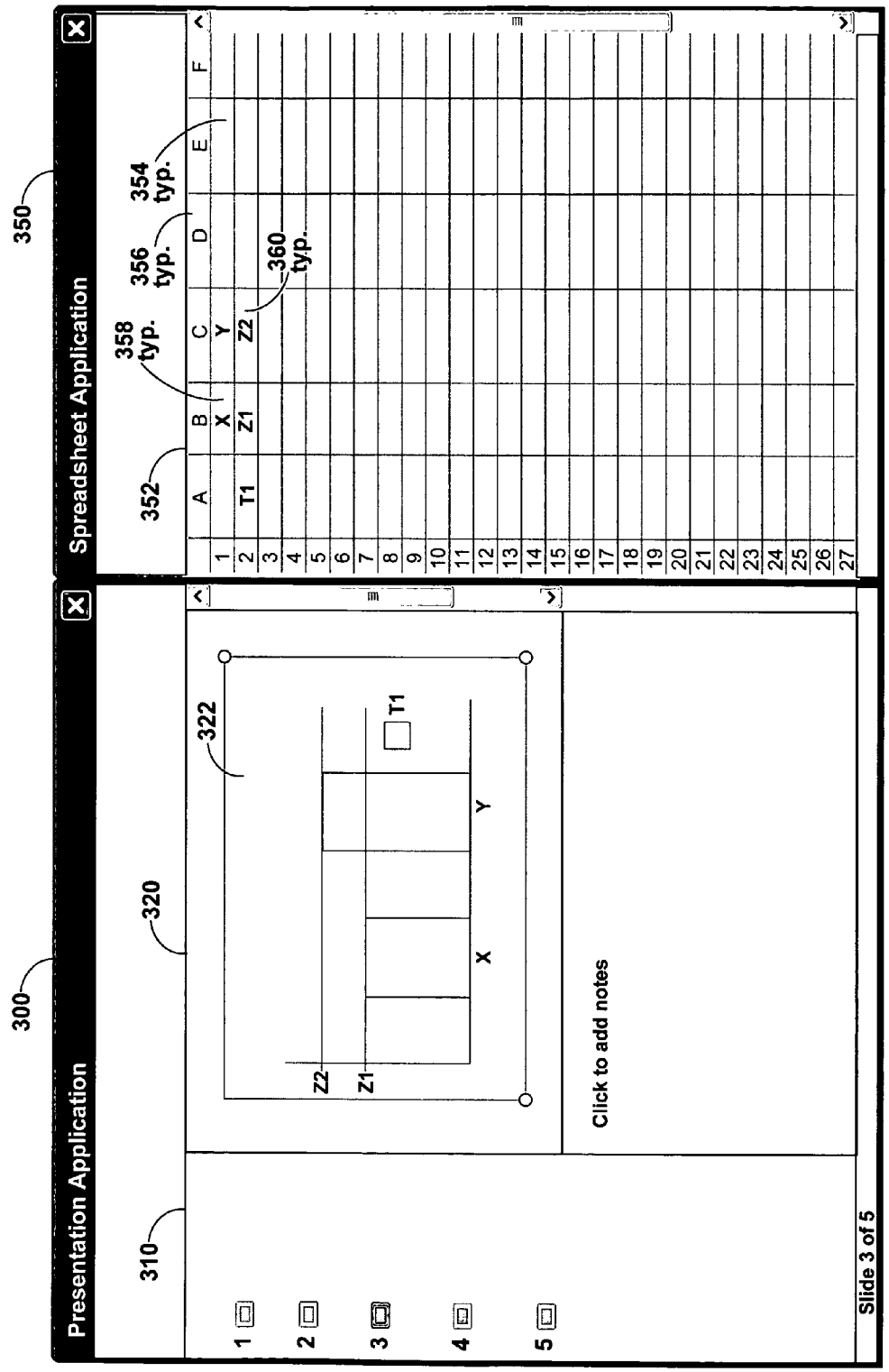
FIG. 3 illustrates another exemplary screenshot of a chart included in a presentation application.

FIG. 3 illustrates another exemplary screenshot of a chart included in a presentation application in accordance with one embodiment. Presentation application 300 is similar to presentation application 200 shown FIG. 2. Presentation application 300 includes slide listing field 310 and slide field 320. Slide field 320 also includes chart 322 which is similar to chart 222 shown in FIG. 2. However, presentation application 300 does not include a window or field similar to chart data field 230. Instead, presentation application 300 initiates spreadsheet application 350 for providing the chart data for chart 322.

Spreadsheet application 350 includes spreadsheet 352 that includes an array of cells. The cells are of various types, including data cells (e.g., data cell 354) and column and row label cells (e.g., column label 356). Within the data cells (e.g., 354) are cells defined by the data they contain. In one example, the data cells included data corresponding to a chart such as chart 320. One type of chart data cell includes a value for the chart (e.g., value cell 360). Another type of data cell associated with a chart includes an axis label that labels an axis or dimension of the chart (e.g., axis label 358). By providing the data for chart 322 according to spreadsheet application 350, chart 322 is able to take advantage of the full feature set provided by spreadsheet application 350 for manipulating charts. Spreadsheet application 350 is provided for chart 322 as soon as edits or manipulations to chart 322 affect the chart data. An exemplary process for handling edits and changes to chart data is described in greater detail below with regard to FIG. 6. By automatically launching spreadsheet application 350 in response to changes to chart 322, the operation between presentation application 300 and spreadsheet application 350 is relatively seamless. In previous designs, to use a spreadsheet application as the source of a charts data, the chart would need to be first created in the spreadsheet and then copied over to presentation application. However, the copied chart was not able to avail itself of the full feature set once in the host application that was available in the spreadsheet application. The present invention solves these limitations by relatively seamlessly sourcing the chart data from the spreadsheet application, allowing a full feature set to be provided for a chart in the host application.

Although the example of FIG. 3 is directed to a chart in a presentation application that has the chart data provided by a spreadsheet application, it is appreciated that other combinations of applications may be used. The host application need not necessary be a presentation application, but may instead be another host application such as a word processor application or other application in which charts may be included. Additionally, even though the chart data is shown as being provided by a spreadsheet application, a spreadsheet application may include other applications, such as databases applications or grid data applications.

Figure 4:
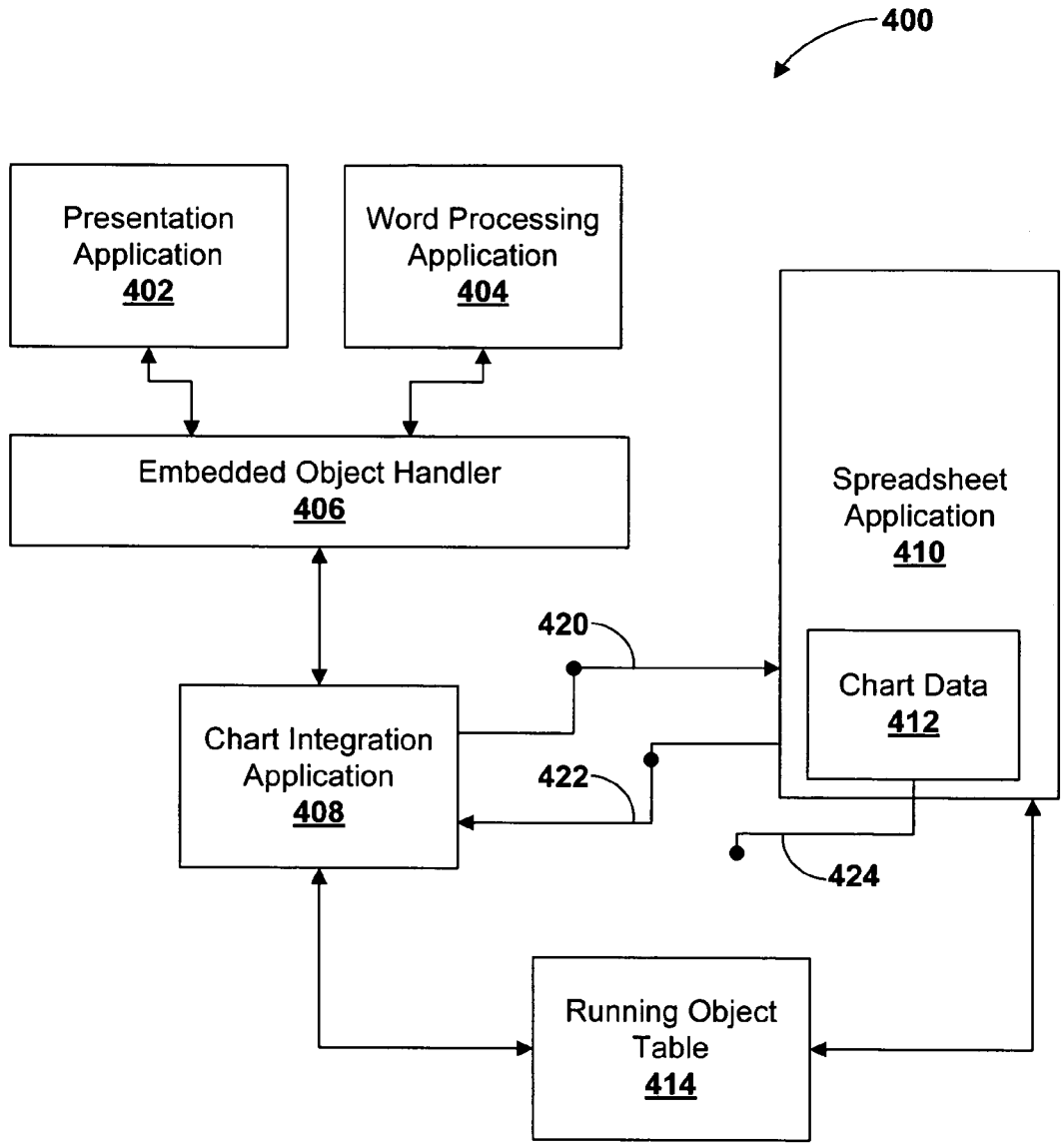
FIG. 4 illustrates a functional diagram of an exemplary system for using a spreadsheet as the source of chart data for a chart included in a host application.

FIG. 4 illustrates a functional diagram of an exemplary system for using a spreadsheet as the source of chart data for a chart included in a host application in accordance with one embodiment. System 400 includes presentation application 402, word processing application 404, embedded object handler 406, chart integration application 408, database/spreadsheet application 410, and running object table 414. Spreadsheet application 410 includes chart data 412 corresponding to a chart included in one of the host applications (402, 404). Although two host applications (402, 404) are shown, any number of host applications may be associated with system 400.

Embedded object handler 406 provides the functionality for supporting objects included in host application documents that are associated with other programs. In one embodiment, embedded object handler 406 corresponds to a graphics program that provides code for integrating graphics objects within host application documents. Embedded object handler 406 provides the interface between chart integration application 408 and the host applications (402, 404). Embedded object handler 406 translates the instructions provided by chart integration application 408 into instructions understood by the host applications (402, 404) for manipulating the graphics objects. In another embodiment, embedded object handler 406 is not included in system 400, and instead, the functionality of embedded object handler 406 is provided by chart integration application 408.

Chart integration application 408 communicates with spreadsheet application 410 to obtain and edit chart data 412. In one embodiment, chart integration application 408 corresponds to chart integration application 120 provided in FIG. 1. Chart integration application 408 is configured to synchronize chart data 412 provided by spreadsheet application 410 with the chart included in the host application (402, 404). Spreadsheet application 410 organizes chart data 412, responds to requests from chart integration application 408, and communicates chart data 412 to chart integration application 408 through a set of COM interfaces (420, 422, 424). In one embodiment, ChartDataSink COM interface 420 enables spreadsheet application 410 to notify chart integration application 408 of updates to chart data 412 and to push those updates to chart integration application 412. In the same embodiment, ChartDataSource COM interface 422 enables chart integration application 408 to initialize spreadsheet application 410 and forward user actions that affect chart data 412 to spreadsheet application 410. ChartDataSourceFactory COM interface 424 enables chart integration application 408 to obtain an instance of ChartDataSource COM interface 422 that is associated with ChartDataSink COM interface 420. In a related further embodiment, a unique instance of ChartDataSink COM interface 420 and ChartDataSource COM interface 422 exists for each chart. Chart integration application 408 may obtain the ChartDataSourceFactory COM interface 424 from running object table 414. Spreadsheet application 410 records ChartDataSourceFactory COM interface 424 in running object table 414 when spreadsheet application 410 is instantiated.

Running object table 414 is a COM system component that enables independent processes to obtain a COM interface from one another. Running object table 414 is used to get ChartDataSourceFactory COM interface 424 from spreadsheet application 410. Instructions are provided to spreadsheet application 410 to create ChartDataSource COM interface 422 that is then associated with a currently open workbook, a workbook that is to be opened from the filesystem, or a workbook that has been embedded in the host application's (402, 404) file. When the workbook is embedded in the host application's (402, 404) file, chart integration application 408 has the responsibility of signaling spreadsheet application 410 that a ChartDataSourceFactory COM interface (e.g., 424) is desired. Spreadsheet application 410 registers an instance of ChartDataSourceFactory COM interface 424 with running object table 414 and chart integration application 408 retrieves the interface from running object table 414. Once chart integration application 408 has the instance of ChartDataSourceFactory COM interface 424, chart integration application 408 invokes a method that requests that an instance of ChartDataSource COM interface 422 be associated to a workbook by specifying a number of parameters. The parameters include information associating ChartDataSource COM interface 422 to the current workbook, a new workbook that is to be populated with sample data supplied by chart integration application 408, a workbook identified by a filename, or a binary stream of data that is the embedded workbook to be loaded by spreadsheet application 410. Once chartdatasourcefactory COM interface 424 is obtained, running object table 414 is out of the process loop. Further communication between spreadsheet application 410 and chart integration application 408 is completed via the COM interfaces (420, 422, 424). The discussion of FIG. 6 below provides a more detail discussion of an exemplary process related to the communication between chart integration application 408 and spreadsheet application 410.

Figure 5:
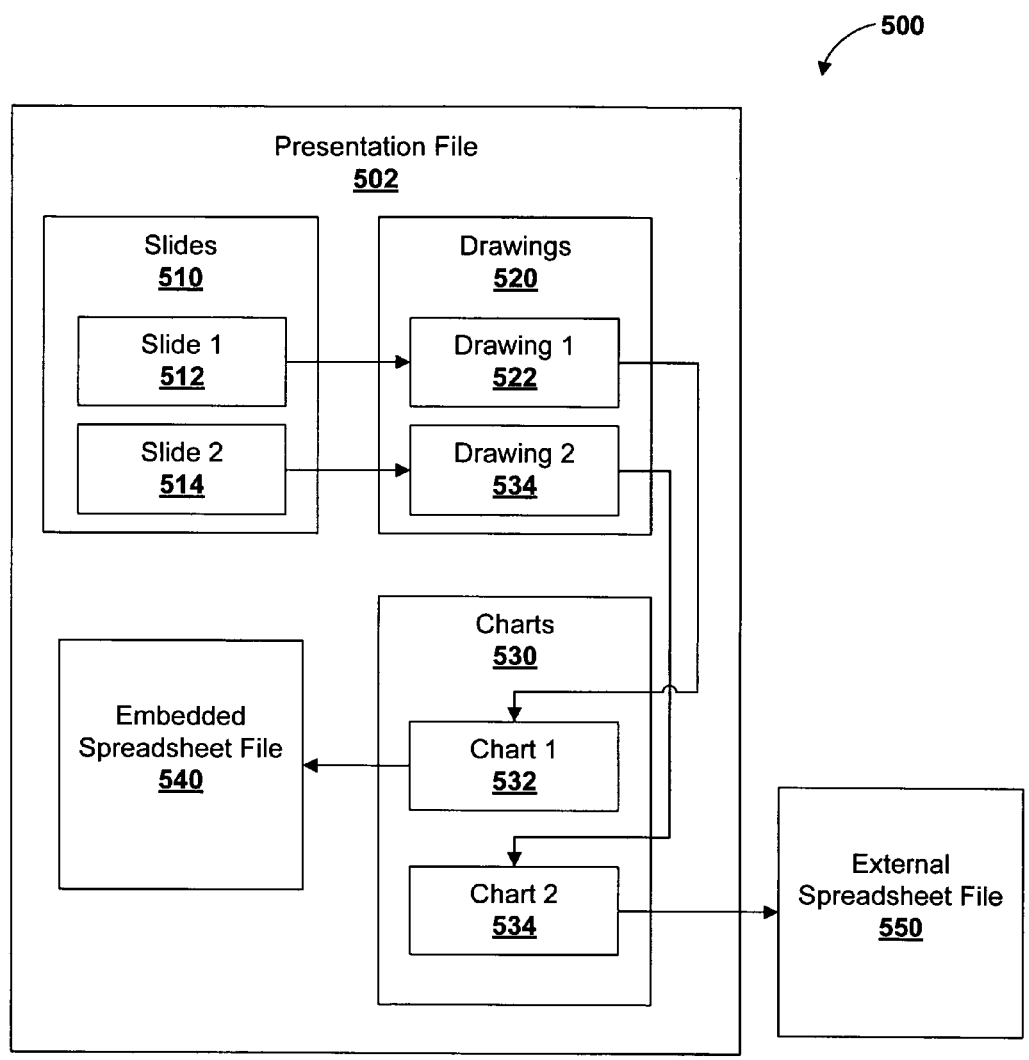
FIG. 5 illustrates a functional diagram of an exemplary file structure for persistence of the chart data.

FIG. 5 illustrates a functional diagram of an exemplary file structure for persistence of the chart data in accordance with one embodiment. This particular embodiment provides a file structure for chart data corresponding to a chart included in a presentation of a presentation application. However, other examples may include file structures for chart data corresponding to other documents of other host applications that include a chart. File structure 500 includes presentation file 502 that corresponds to a presentation of a presentation application, and external spreadsheet file 550 that corresponds to a spreadsheet of a spreadsheet application.

Presentation file 502 is organized into slides 510, drawings 520, charts 530, and may possibly include embedded spreadsheet file 540. Slides 510 include any number of slides (e.g., 512, 514) associated with a particular presentation. If drawing data is included in a slide, then a slide (e.g., 512) is associated with a drawing file (e.g., 522). If the drawing data corresponds to a chart, then the drawing (e.g., 522) is further associated with a chart file (e.g., 532). In one embodiment, the chart file (e.g., 532) includes the type of chart being used, the presentation of the chart, the format of the chart, and other information related to presenting the chart within a slide. In this embodiment, the values included on the chart are obtained from another file (e.g., 540, 550) associated with a spreadsheet, but the presentation application determines the format for display of that data. In another embodiment, the chart file (e.g., 532) is more similar to a pointer and directs the presentation application to another file (e.g., 540, 550) that includes the chart data. In this embodiment, the spreadsheet application determines both the values and format to be used for a chart, and the presentation application merely has the responsibility of displaying the chart within a particular slide. An actual implementation of the chart in the presentation may divide the responsibilities for formatting of the chart between the host application and the spreadsheet application along different lines than, or as gradations of the embodiments described above. Additionally, a user may be presented with a selection to use the formatting of the presentation or the formatting of the data included in the spreadsheet application.

As shown, the data for a chart may be provided by a spreadsheet file (e.g., 540) that is embedded in the presentation file, or provided by a spreadsheet file (e.g., 550) that is stored externally. Whether the spreadsheet is stored locally with presentation file 502 or stored externally and linked to by presentation file 502 is a selection that may be made by the user. For example, a user may be presented with a dialogue window that allows the user to select to have the chart linked to an external spreadsheet, have the spreadsheet copied to the presentation file, or possibly just retrieve an image of the chart. Each selection has advantages and disadvantages with regard to editing the chart, the file size of the host application file, and the portability of the file.

Figure 6:
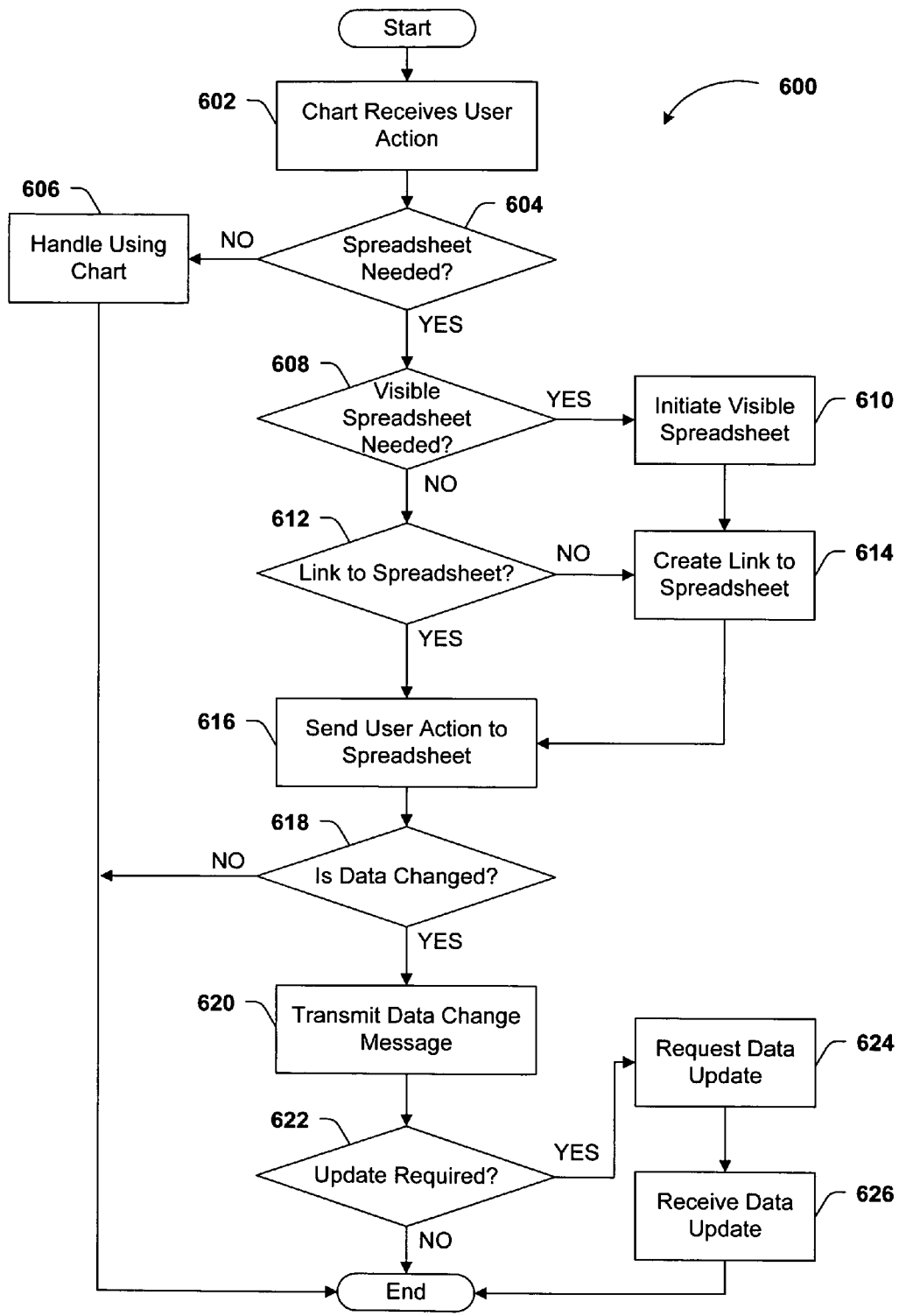
FIG. 6 illustrates a logical flow diagram of an exemplary process for interaction between a spreadsheet and a host application for providing the data of a chart included in the host application, in accordance with one embodiment of the present invention.

FIG. 6 illustrates a logical flow diagram of an exemplary process for interaction between a spreadsheet and a host application for providing the data of the chart included in the host application, in accordance with one embodiment. Process 600 starts where a chart is inserted into a host application document and awaiting interaction by a user. Processing continues with action receipt operation 602.

Action receipt operation 602 receives the user action on the chart at the chart integration application (see 408 of FIG. 4). In one embodiment, the host application registers the user action as a keystroke, mouse click, or other input entry into the host application and associates that input as being related to the chart in the host application document. Once the chart integration application receives notice of the user action, processing continues to spreadsheet need decision operation 604.

Spreadsheet need decision operation 604 determines whether the spreadsheet is needed to respond to the user action that affected the chart. In certain scenarios, the user action may change a portion of the chart without affecting the chart data supplied by the spreadsheet application. For example, the position of the chart within the document may change. Such a change may be routed to the chart integration application for processing. However, access to the spreadsheet for making the change is not needed. If the spreadsheet is not needed to respond to the user action, processing moves to chart handling operation 606.

Chart handling operation 606 handles the user action without accessing the chart data provided by the spreadsheet. In one embodiment, functionality is included in the host application for handling these changes to the chart. In another embodiment, a function call is made by the host application for handling the user action for the chart. Once the user action is addressed, process 600 ends and processing waits for the next user action or continues with other tasks.

Alternatively, if the spreadsheet is needed to respond to the user action, processing continues with visibility decision operation 608. Visibility decision operation 608 determines whether a visible spreadsheet is needed for responding to the user action. A visible spreadsheet may be needed when the user action involves providing the user with the opportunity to change chart data, formulas, or other aspects of the chart provided by the spreadsheet. The spreadsheet may be needed to allow the user to interact with the chart data while in the spreadsheet format. In contrast, the user may not need to have the visible instance of spreadsheet initiated. In an additional embodiment, the visible instance of the spreadsheet application and the non-visible instance of the spreadsheet application are associated with separate processes. When the interaction with the spreadsheet application is being provided by the non-visible process the user action may correspond to a change that does not require that the user be allowed to interact with the chart data. If a visible spreadsheet is needed, processing continues to initiation operation 610.

Initiation operation 610 initiates a visible instance of the spreadsheet application. In one embodiment, the spreadsheet application is initiated and the views of the spreadsheet application and the host application are "tiled" or coincidentally displayed so that both applications may be substantially viewed in a limited viewing area. Tiling the applications allows both to be viewed in the display screen available. Once the spreadsheet application is initiated, processing continues with link creation operation 614.

If instead of a visible instance of the spreadsheet, only a link to the spreadsheet is needed, then processing continues from visibility decision operation 608 to link determination operation 612. Link determination operation 612 determines whether a link to the spreadsheet is already established. For example, the spreadsheet may be stored in the host application file. Stored internally with relation to the host application, a link to the spreadsheet need not be established. In contrast, the spreadsheet may also be in a different location in memory that is associated with the spreadsheet application or may even be associated with a separate computing device entirely. However, when the spreadsheet is external and/or remote when compared to the host application, a link may have already been made between the chart included in the host application and the spreadsheet. For example, a previous user action may have established a link between the chart and the spreadsheet. Accordingly, the current user action need not establish the link again. If a link to the spreadsheet has not already been initiated, processing continues with link creation operation 614.

Link creation operation 614 initiates the link between the spreadsheet application and the chart of the host application. In one embodiment, initiating the link is similar whether a visible instance of the spreadsheet has been initiated or not. In another embodiment, the link is generated according to COM interfaces that allow for a general transmission protocol to be used between the chart and the spreadsheet. Once the link is created, processing continues with send action operation 616.

Whether the link was previously available from link determination operation 612, or the link was newly generated according to link creation process 614, once the link is established, the chart integration application transmits notification of the user action to the spreadsheet application. After the spreadsheet receives the notification, processing continues at change determination operation 618.

Change determination operation 618 discovers from the user action, whether the user action affected a change to the chart data. It may be that the chart data was not actually changed by the user action. For example, the user may have selected to view the chart data. In this example, a visible instance of the spreadsheet application would be initiated and a link between the chart and spreadsheet would be created and the requested operation would be complete. If the data is not changed by the user action, then process 600 ends and processing waits for the next user action or continues with other tasks.

In contrast, if the user action does alter the chart data, processing continues with data change operation 620. Data change operation 620 then relays back to the chart integration application that the data changed. Once this data change message is received, processing continues at update decision operation 622.

Update decision operation 622 determines whether an update to the chart is necessary due to the changes that occurred in the chart data. In one embodiment, the update corresponds to a refresh of the representation of the chart data within the chart. If an update is not necessary, process 600 ends and processing waits for the next user action or continues with other tasks. However, if an update is necessary, then processing continues to update request operation 624.

Update request operation 624 requests an update of the chart data from the spreadsheet application. In one embodiment, the update request is configured as a request for the entire set of chart data provided by the spreadsheet application. In another embodiment, the update request is for any portions of the chart data that have changed and not the entire chart data file. Once the update request is sent, processing continues with update receipt operation 626.

Update receipt operation 626 receives the update of the chart data and applies the update to the chart in the host application. In one embodiment, the updated refreshes only those portions of the chart that changed since the chart was last updated or created. In another embodiment, the update replaces the existing chart with a new chart that corresponds to the most recent chart data provided in response to the request. Once the chart is updated, process 600 ends and processing waits for the next user action or continues with other tasks.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for managing and editing a host chart presented in a host application, the method comprising:

displaying the host chart using host chart data in a host application that is stored in a first location that includes a host feature set for interacting with the host chart, wherein the host chart data is associated with separate application chart data from a separate application that is stored in a second location that has a separate application feature set that includes more features than the host feature set for interacting with the host chart;

automatically determining when a manipulation to the host chart is a change to the host chart data that requires an additional feature that is not available in the host feature set;

in response to determining the additional feature is not available in the host feature set:

determining when the manipulation that changes the host chart data can be carried out without a visible instance of the separate application and when determined initiating a non-visible instance of the separate application that does not include a display of the separate application chart data;

determining whether an instance of the separate application is to be made visible to respond to the manipulation that changes the host chart data;

in response to determining the instance of the separate application is to be made visible:

displaying the host chart in the host application;

initiating the separate application and displaying the separate application chart data in a window associated with the separate application near a display of the host chart; wherein the additional feature is included in the separate application feature set;

providing functionality for editing the separate application chart data; and communicating changes made to the separate application chart data that occur within the separate application to the host application to update the host chart data that is stored in the first location, wherein the changes to the separate application chart data are reflected in the presentation of the host chart in the host application.

2. The computer-implemented method of claim 1, further comprising wherein the manipulation to the host chart data within the host application is a change to a formula for the host chart.

3. The computer-implemented method of claim 2, wherein displaying the separate application chart data in the separate application comprises displaying the separate application chart data in a second window that is displayed adjacently to a first window displaying the host chart in the host application such that both the host chart in the host application is viewable and the separate application chart data in the separate application is viewable.

4. The computer-implemented method of claim 2, further comprising communicating the changes to the host chart to the separate application.

5. The computer-implemented method of claim 1, wherein providing functionality for editing the separate application chart data comprises initiating a spreadsheet application as the separate application.

6. The computer-implemented method of claim 5, wherein the visible instance of the separate application is provided coincidentally in the display with a visible instance of the host application.

7. The computer-implemented method of claim 1, wherein providing functionality for editing the separate application chart data comprises instantiating a non-visible instance of the separate application when a determination is made that a visible instance of the separate application is not necessary.

8. The computer-implemented method of claim 1, further comprising creating a link between the host application and the separate application prior to communicating between the host application and the separate application.

9. The computer-implemented method of claim 8, wherein the link corresponds to at least one COM interface for implementing communication between applications.

10. The computer-implemented method of claim 1, further comprising changing the chart data corresponding to the host chart with the separate application when the separate application chart data is edited in the separate application.

11. The computer-implemented method of claim 1, wherein the separate application is a spreadsheet application.

12. The computer-implemented method of claim 1, wherein communicating changes to the separate application chart data that occur within the separate application to the host application further comprises handling the communication according to a chart integration application.

13. A computer-readable storage medium having stored thereon instructions that when executed implements the computer-implemented method of claim 1.

14. A system, comprising:
a processor and a computer-readable storage medium;
an operating environment stored on the computer-readable storage medium and executing on the processor;
an application operating under the control of the operating environment executing on the processor and configured for:
a host application, wherein the host application includes a presentation of a host chart within a host application document; wherein the host application includes a host feature set for interacting with the host chart;
a spreadsheet application, wherein the spreadsheet application is configured to display a spreadsheet of spreadsheet chart data corresponding to the host chart included in the host application document; wherein the spreadsheet application includes a spreadsheet feature set that includes additional features from the host feature set of the host application for interacting with the host chart; wherein the spreadsheet application is automatically launched in response to a determination that a manipulation to the host chart within the host application changes host chart data that is stored in a different location from the spreadsheet chart data and requires one or more of the additional features of the spreadsheet application;
after launching the spreadsheet application, creating a link between the host chart and the spreadsheet application when the link does not exist;
wherein a determination is made as to when the manipulation to the host chart can be carried out without a visible instance of the spreadsheet application and not displaying the spreadsheet chart data, and when the spreadsheet application is to be visible, wherein in response to determining the spreadsheet application is to be visible, the spreadsheet application presents a display of the spreadsheet chart data within a different window but near the presentation of the host chart provided by the host application; and
a chart integration application that is configured to receive changes to the spreadsheet chart data an update the host chart data and to manage integration of the host chart included in the host application document and the spreadsheet chart data provided by the spreadsheet application.

15. The system of claim 14, wherein the chart integration application communicates with the spreadsheet application through at least one COM interface.

16. The system of claim 15, further comprising a running object table wherein one of the at least one COM interfaces is stored such that other COM interfaces are associated with one another such a particular chart is associated with a particular set of chart data.

17. The system of claim 14, further comprising an embedded object handler that is configured to handle displaying the host chart separate from the integration of the host chart with the host chart data.

18. The system of claim 14, further comprising structuring storage of the chart within the host application to include a link between the host chart and the spreadsheet when the spreadsheet belongs to one of an embedded spreadsheet file and an external spreadsheet file.

19. A computer-readable storage medium having stored thereon instructions that when executed implements the system of claim 14.

20. A computer-readable storage medium having stored thereon computer-executable instructions for managing and editing a host chart presented in a host application, the computer-executable instructions comprising:
receiving a user action to change host chart data that is associated with the host chart in the host application; wherein the host application includes a host feature set for interacting with the host chart;
determining whether a spreadsheet application is needed according to the user action; wherein the determination comprises automatically determining when the user action that is associated with the host chart within the host application changes the host chart data and requires an additional feature that is not available in the host feature set of the host application;
determining when the user action that is associated with the host chart can be carried out without a visible instance of the spreadsheet application that does not display a visible instance of spreadsheet chart data that is associated with the host chart data;

in response to determining the user action requires the additional feature that is not available in the host feature set, determining whether a visible instance of the spreadsheet application is required to handle the user action;

creating the visible instance of the spreadsheet application including a display of the spreadsheet chart data near a display of the host chart;

generating a link between the host application and the spreadsheet application comprising creating the link when the link is not established between the spreadsheet application and the host chart;

sending the user action to the spreadsheet application;

determining whether the spreadsheet application chart data changes; and determining whether an update to the host chart data that is stored in a different location from the spreadsheet application data is required based on the changes to the spreadsheet application chart data.

* * * * *